United States Patent
Nagahara et al.

(10) Patent No.: US 9,851,713 B2
(45) Date of Patent: Dec. 26, 2017

(54) OPERATION-TIME CALCULATION DEVICE AND METHOD FOR CALCULATING OPERATION TIME

(71) Applicant: Hitachi, Ltd., Tokyo (JP)

(72) Inventors: Satoshi Nagahara, Tokyo (JP); Hisaya Ishibashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 731 days.

(21) Appl. No.: 14/361,379

(22) PCT Filed: Oct. 4, 2012

(86) PCT No.: PCT/JP2012/075783
§ 371 (c)(1),
(2) Date: May 29, 2014

(87) PCT Pub. No.: WO2013/080660
PCT Pub. Date: Jun. 6, 2013

(65) Prior Publication Data
US 2014/0324207 A1 Oct. 30, 2014

(30) Foreign Application Priority Data
Dec. 2, 2011 (JP) .................................. 2011-264998

(51) Int. Cl.
*G06F 19/00* (2011.01)
*G05B 19/418* (2006.01)
(Continued)

(52) U.S. Cl.
CPC ....... *G05B 19/41865* (2013.01); *G06Q 50/04* (2013.01); *G07C 3/00* (2013.01); *Y02P 90/30* (2015.11)

(58) Field of Classification Search
CPC .... G05B 19/41865; G07C 3/00; G06Q 50/04; Y02P 90/30
(Continued)

(56) References Cited

U.S. PATENT DOCUMENTS 5,237,508 A * 8/1993 Furukawa ........ G05B 19/41865
700/100
5,850,343 A * 12/1998 Nakamura ....... G05B 19/41835
700/112

(Continued)

FOREIGN PATENT DOCUMENTS

| JP | 10-261122 A | 9/1998 |
|---|---|---|
| JP | 2003-256619 | 9/2003 |

(Continued)

OTHER PUBLICATIONS

Chen et al., A Time Window Based Approach for Job Shop Scheduling, May 2001, IEEE Proceedings 2001.*
(Continued)

*Primary Examiner* — Ziaul Karim
(74) *Attorney, Agent, or Firm* — Baker Botts L.L.P.

(57) ABSTRACT

The operation-time calculation device is configured such that the following processes are performed: a process in which operation-data information, work-time information, and operation-time information are stored in a storage unit, an input unit receives from a user parameter input at least including steps to be aggregated, aggregation start time, aggregation finish time, and aggregation unit time period, and a controller sets the aggregation time period on the basis of the parameters that were input; a process for converting total work time of the steps to be aggregated in each aggregation time period and the corresponding operation time using an operation-time conversion coefficient and calculating total operation time of the steps to be aggregated in the aggregation time period; a process for calculating the
(Continued)

differential between total work time of the aggregation time period and total operation time; and a process for changing the operation-time conversion coefficient to minimize the differential.

4 Claims, 20 Drawing Sheets

(51) Int. Cl.
  *G06Q 50/04* (2012.01)
  *G07C 3/00* (2006.01)
(58) Field of Classification Search
  USPC .......................................................... 700/100
  See application file for complete search history.

(56) References Cited

U.S. PATENT DOCUMENTS

| | | | |
|---|---|---|---|
| 8,600,535 B2 | 12/2013 | Nonaka et al. | |
| 2007/0288306 A1* | 12/2007 | Ohishi | G06Q 10/06 700/113 |
| 2008/0027976 A1* | 1/2008 | Nakamura | G05B 19/4183 |
| 2008/0172280 A1* | 7/2008 | Goulimis | G06Q 10/06 705/7.25 |
| 2009/0199052 A1* | 8/2009 | Yamaguchi | G06Q 10/06395 714/57 |
| 2010/0161681 A1* | 6/2010 | Zaifman | G06F 17/30294 707/803 |
| 2010/0242935 A1* | 9/2010 | Takubo | F02D 41/0025 123/703 |

FOREIGN PATENT DOCUMENTS

| | | |
|---|---|---|
| JP | 2003-256619 A | 9/2003 |
| JP | 2004-46713 A | 2/2004 |
| JP | 2006-127012 A | 5/2006 |
| JP | 2009-9380 A | 1/2009 |
| JP | 2010-128654 A | 6/2010 |
| JP | 2011-159218 A | 8/2011 |

OTHER PUBLICATIONS

P Ji et al., A Genetic Algorithm of determining cycle time for printed circuit board assembly lines, Jan. 2001, European Journal of Operational Research.*

Ferdinand Levy, Adaptation in the Production Process, Apr. 1965, INFORMS, vol. 11 No. 6, pp. B136-B154.*

JP Office Action for Japanese Application No. 2011-264998, dated Jun. 10, 2014.

* cited by examiner

F I G . 1
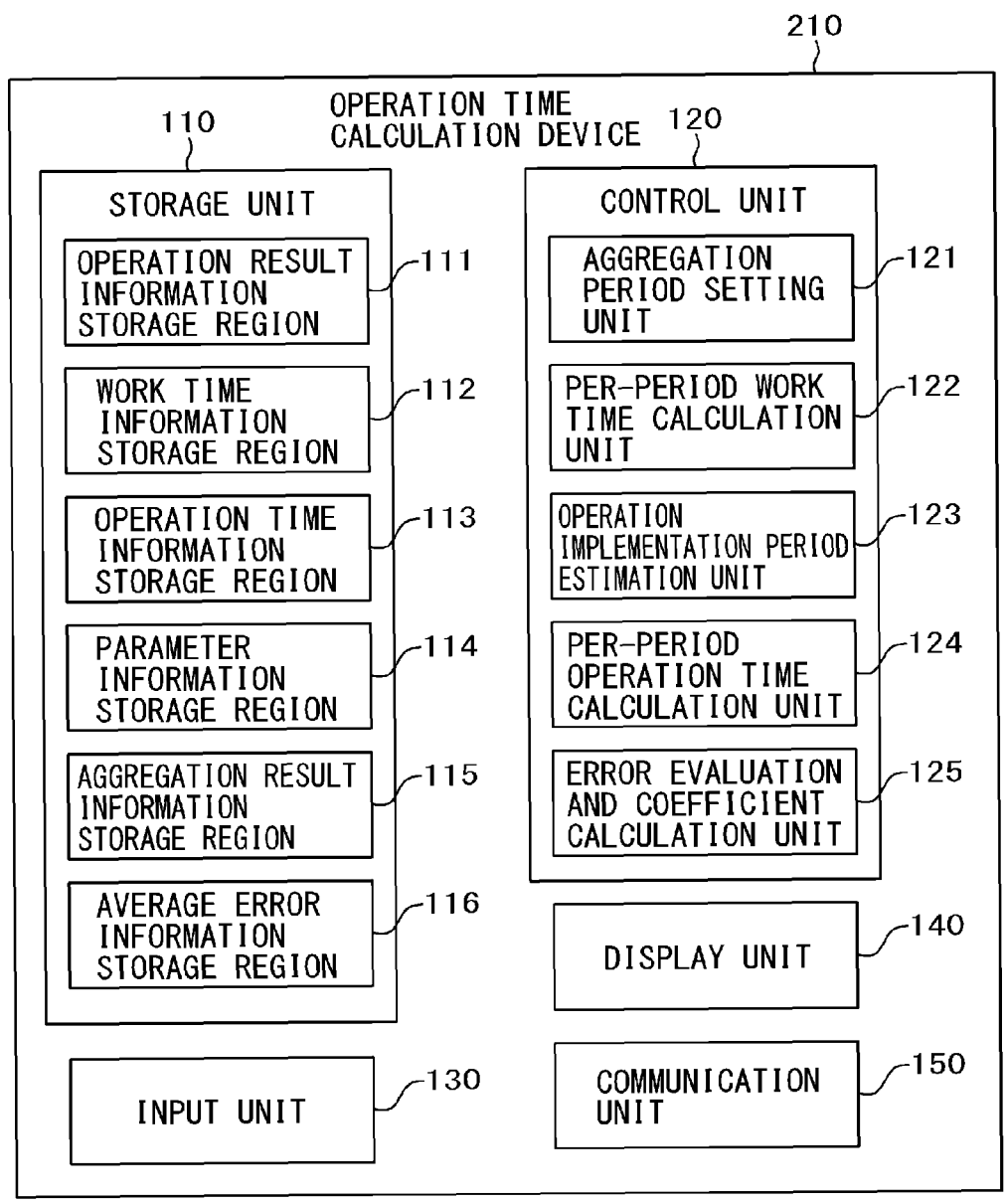

FIG. 4

| COMPONENT NO. (111a) | PRODUCT TYPE (111b) | OPERATION PROCESS NO. (111c) | OPERATION PROCESS (111d) | OPERATION START DATE AND TIME (111e) | OPERATION END DATE AND TIME (111f) |
|---|---|---|---|---|---|
| A001 | A | 1 | SIZING LATHE | 2010/7/1 13:53 | 2010/7/1 14:17 |
| A001 | A | 2 | OUTSIDE DIAMETER LATHE | | |
| A001 | A | 3 | MACHINING | 2010/7/2 14:47 | 2010/7/3 9:30 |
| A001 | A | 4 | GRINDING | | 2010/7/3 15:30 |
| B001 | B | 1 | SIZING LATHE | 2010/7/3 17:12 | |
| : | : | : | : | : | : |

FIG. 5

| DATE (112a) | EQUIPMENT/ WORKER NO. (112b) | ASSIGNED PROCESS (112c) | WORK TIME (112d) |
|---|---|---|---|
| 2010/7/1 | A | SIZING LATHE | 7.75h |
| 2010/7/1 | b | SIZING LATHE | 7.75h |
| 2010/7/1 | c | OUTSIDE DIAMETER LATHE | 7.75h |
| 2010/7/1 | d | MACHINING | 7.75h |
| 2010/7/1 | e | MACHINING | 7.75h |
| : | : | : | : |

FIG.6

| PRODUCT TYPE (113a) | OPERATION PROCESS NO. (113b) | OPERATION PROCESS (113c) | INITIALLY SET OPERATION TIME (113d) | OPERATION TIME CONVERSION COEFFICIENT (113e) |
|---|---|---|---|---|
| A | 1 | SIZING LATHE | 0.5h | 1 |
| A | 2 | OUTSIDE DIAMETER LATHE | 1.2h | 1 |
| A | 3 | MACHINING | 3.3h | 1 |
| A | 4 | GRINDING | 2.1h | 1 |
| B | 1 | SIZING LATHE | 0.8h | 1 |
| : | : | : | : | : |

FIG.7

| ITEM (114a) | VALUE (114b) |
|---|---|
| AGGREGATION TARGET PROCESS | SIZING LATHE |
| AGGREGATION START DATE AND TIME | 2010/7/1 0:00 |
| AGGREGATION END DATE AND TIME | 2010/9/30 0:00 |
| AGGREGATION UNIT PERIOD | 7 DAYS |
| CONVERSION ITERATION COUNT UPPER LIMIT | 100 |

FIG.8

| AGGREGATION PERIOD START DATE AND TIME (115a) | AGGREGATION PERIOD END DATE AND TIME (115b) | TOTAL WORK TIME (115c) | TOTAL OPERATION TIME BEFORE CONVERSION (115d) | TOTAL OPERATION TIME AFTER CONVERSION (115e) |
|---|---|---|---|---|
| 2010/7/1 0:00 | 2010/7/8 0:00 | 130h | 202h | 127h |
| 2010/7/8 0:00 | 2010/7/15 0:00 | 121h | 140h | 130h |
| 2010/7/15 0:00 | 2010/7/22 0:00 | 109h | 156h | 105h |
| 2010/7/22 0:00 | 2010/7/29 0:00 | 137h | 185h | 130h |
| 2010/7/29 0:00 | 2010/8/5 0:00 | 140h | 203h | 132h |
| : | : | : | : | : |

FIG.9

| ITEM (116a) | VALUE (116b) |
|---|---|
| ERROR BEFORE CONVERSION | 70% |
| ERROR AFTER CONVERSION | 30% |

FIG.20

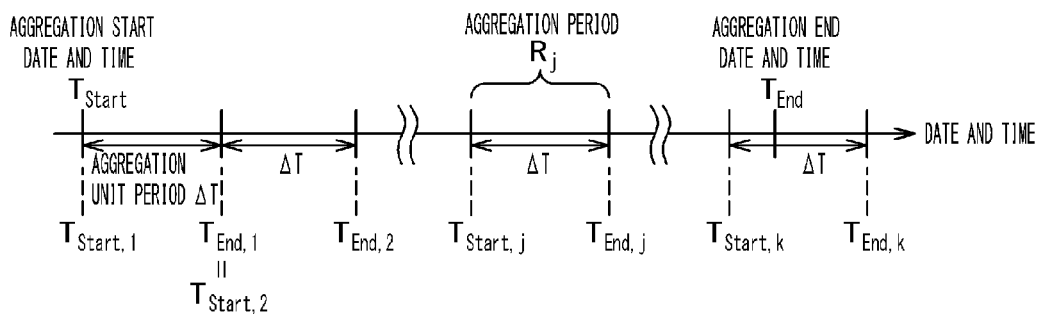

FIG.21

(1) ESTIMATING THE OPERATION IMPLEMENTATION PERIOD: WHEN THERE IS IS NO OMISSION IN RECORD i IN OPERATION RESULT INFORMATION

OPERATION RESULT INFORMATION

| COMPONENT NO. | PRODUCT TYPE | OPERATION PROCESS NO. | OPERATION PROCESS | OPERATION START DATE AND TIME | OPERATION END DATE AND TIME | |
|---|---|---|---|---|---|---|
| A001 | A | 1 | SIZING LATHE | 2010/7/1 13:53 | 2010/7/1 14:17 | |
| A001 | A | 2 | OUTSIDE DIAMETER LATHE | 2010/7/1 14:23 | 2010/7/1 14:40 | RECORD i |
| A001 | A | 3 | MACHINING | 2010/7/2 14:47 | 2010/7/3 9:30 | |
| ⋮ | ⋮ | ⋮ | ⋮ | ⋮ | ⋮ | |

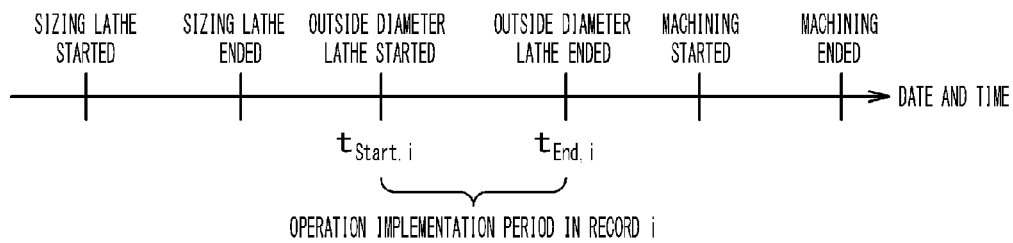

FIG.22

(2) ESTIMATING THE OPERATION IMPLEMENTATION PERIOD: WHEN OPERATION START DATE AND TIME IS OMITTED FROM RECORD i IN OPERATION RESULT INFORMATION

OPERATION RESULT INFORMATION

| COMPONENT NO. | PRODUCT TYPE | OPERATION PROCESS NO. | OPERATION PROCESS | OPERATION START DATE AND TIME | OPERATION END DATE AND TIME | |
|---|---|---|---|---|---|---|
| A001 | A | 1 | SIZING LATHE | 2010/7/1 13:53 | 2010/7/1 14:17 | |
| A001 | A | 2 | OUTSIDE DIAMETER LATHE |  | 2010/7/1 14:40 | RECORD i |
| A001 | A | 3 | MACHINING | 2010/7/2 14:47 | 2010/7/3 9:30 | |
| ⋮ | ⋮ | ⋮ | ⋮ | ⋮ | ⋮ | |

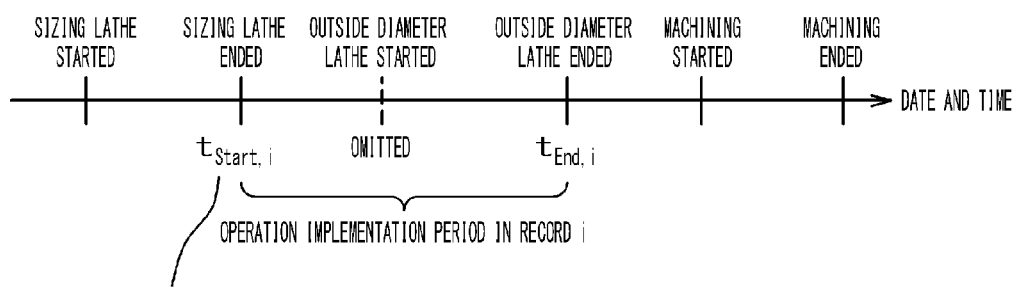

FIG. 23

(3) ESTIMATING THE OPERATION IMPLEMENTATION PERIOD: WHEN OPERATION END DATE AND TIME IS OMITTED FROM RECORD i IN OPERATION RESULT INFORMATION

OPERATION RESULT INFORMATION

| COMPONENT NO. | PRODUCT TYPE | OPERATION PROCESS NO. | OPERATION PROCESS | OPERATION START DATE AND TIME | OPERATION END DATE AND TIME | |
|---|---|---|---|---|---|---|
| A001 | A | 1 | SIZING LATHE | 2010/7/1 13:53 | 2010/7/1 14:17 | |
| A001 | A | 2 | OUTSIDE DIAMETER LATHE | 2010/7/1 14:23 | | RECORD i |
| A001 | A | 3 | MACHINING | 2010/7/2 14:47 | 2010/7/3 9:30 | |
| ⋮ | ⋮ | ⋮ | ⋮ | ⋮ | ⋮ | |

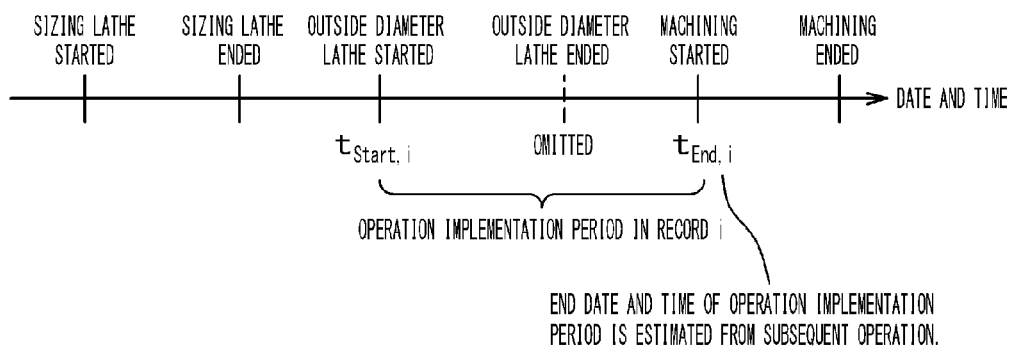

END DATE AND TIME OF OPERATION IMPLEMENTATION PERIOD IS ESTIMATED FROM SUBSEQUENT OPERATION.

FIG. 25

| ITEM | VALUE | |
|---|---|---|
| AGGREGATION TARGET PROCESS | SIZING LATHE | ~131a |
| AGGREGATION START DATE AND TIME | 2010/7/1 0:00 | ~131b |
| AGGREGATION END DATE AND TIME | 2010/9/30 0:00 | ~131c |
| AGGREGATION UNIT PERIOD | 7 DAYS | ~131d |
| CONVERSION ITERATION COUNT UPPER LIMIT | 100 | ~131e |

PARAMETER INFORMATION

ENTER ~131f

OPERATION-TIME CALCULATION DEVICE AND METHOD FOR CALCULATING OPERATION TIME

TECHNICAL FIELD

The present invention relates to techniques regarding an operation time calculation device and a method for calculating operation time using operation result information from a manufacturing floor.

BACKGROUND ART

In order to implement production planning and manufacturing cost management with precision, it is necessary to accurately estimate input data composed of the operation time information about each manufacturing process of each product. The methods for estimating operation time include: (1) a method of dividing the operation into elementary operations (to move, to turn a screw, etc.), before aggregating predefined elementary operation times based on product specifications to calculate the operation time; and (2) a method of calculating the time actually required to perform the operation (actual operation time) from operation result information, and categorizing the results of the calculation by product specification and by manufacturing condition. The method (1) above has the problem of requiring a large amount of man-hours in measuring the elementary operation times and dividing the operation into the elementary operations, as well as the problem of the aggregated elementary operation times resulting in a divergence from the actual operation time. Thus the method (2) above is generally employed.

In the past, an example of calculating operation time using operation result information such as the method (2) above has been disclosed by PTL 1, the disclosure being the method of calculating individual operation times based on the operation start date and time and on the operation end date and time from operation result information, the results of the calculation being categorized by product specification and subjected to statistical processing, thereby calculating the operation time per product specification. PTL 2 discloses a method of calculating individual operation times in a manner similar to that of PTL 1, the disclosed method categorizing the calculated individual operation times by event (equipment failure, change of job count within a lot, etc.) that occurred on the manufacturing floor while the operation was being implemented, whereby the operation time is calculated from the currently occurring event.

CITATION LIST

Patent Literature

PTL 1: Japanese Patent Application Laid-Open No. 2006-127012
PTL 2: Japanese Patent Application Laid-Open No. 2009-9380

SUMMARY OF INVENTION

Technical Problem

The existing methods for calculating operation time such as those disclosed by PTL 1 and 2 presuppose that individual operation times can each be calculated from the operation start date and time and operation end date and time. For example, the operation time is calculated by subtracting the operation start date and time from the operation end date and time. However, on the actual manufacturing floor, particularly on a manufacturing floor where operation result information is recorded manually, there may well be cases in which losses occur in operation result information due to omissions and delays so that the operation start dates and times and operation end dates and times may not be obtained of the entire operation. There may even be cases in which only operation end dates and times are recorded, with no operation start dates and times recorded in the first place. In such cases, individual operation times cannot be calculated through the process of subtracting the operation start date and time from the operation end date and time. The existing methods for calculating operation time are thus not practicable.

Solution to Problem

In solving the above problems and according to the present invention, there is provided an operation time calculation device using operation result information from a manufacturing floor, the operation time calculation device including a storage unit, an input unit, a control unit, and a display unit. The storage unit stores operation result information including at least operation process information, start date and time information, and end date and time information about each operation implemented; work time information including at least an assigned process, a date, and a work time per piece of equipment and per worker; and operation time information including at least a product type, an operation process, an initially set operation time, and an operation time conversion coefficient. The input unit accepts input, from a user, of parameters regarding at least an aggregation target process, an aggregation start date and time, an aggregation end date and time, and an aggregation unit period. The control unit performs a process in which an aggregation period is set based on the input aggregation start date and time, aggregation end date and time, and aggregation unit period; a process in which a total work time of the aggregation target process in each aggregation period is calculated by a search through the work time information, and a total operation time of the aggregation target process in each aggregation period is calculated by a search through the operation result information and the operation time information and by converting the corresponding operation time using the operation time conversion coefficient; a process in which an error is calculated between the total work time and the total operation time in each aggregation period; and a process in which the operation time conversion coefficient is changed so as to minimize the error. The display unit displays the operation time conversion coefficient, a graph comparing the total work time with the total operation time in each aggregation period before and after the operation time conversion, and the errors involved, all being obtained in the processes performed by the control unit.

In solving the above problems and also according to the present invention, there is provided an operation time calculation method using operation result information from a manufacturing floor, the operation time calculation method including causing a computer equipped with a storage unit, an input unit, a control unit, and a display unit to function so that the storage unit stores operation result information including at least operation process information, start date and time information, and end date and time information about each operation implemented; work time information including at least an assigned process, a date, and a work time per piece of equipment and per worker; and operation time information including at least a product type, an operation process, an initially set operation time, and an operation time conversion coefficient; that the input unit accepts input, from a user, of parameters regarding at least an aggregation target process, an aggregation start date and time, an aggregation end date and time, and an aggregation unit period; that the control unit performs a process in which an aggregation period is set based on the input aggregation start date and time, aggregation end date and time, and aggregation unit period; a process in which a total work time of the aggregation target process in each aggregation period is calculated by a search through the work time information, and a total operation time of the aggregation target process in each aggregation period is calculated by a search through the operation result information and the operation time information and by converting the corresponding operation time using the operation time conversion coefficient; a process in which an error is calculated between the total work time and the total operation time in each aggregation period; and a process in which the operation time conversion coefficient is changed so as to minimize the error; and that the display unit displays the operation time conversion coefficient, a graph comparing the total work time with the total operation time in each aggregation period before and after the operation time conversion, and the errors involved, all being obtained in the processes performed by the control unit.

Advantageous Effects of Invention

According to the present invention, the user of this device can calculate operation times even if operation start dates and times or operation end dates and times are missing from work result information.

BRIEF DESCRIPTION OF DRAWINGS

FIG. 1 is a functional block diagram of an operation time calculation device.

FIG. 4 is a schematic view of an operation result information table.

FIG. 5 is a schematic view of a work time information table.

FIG. 6 is a schematic view of an operation time information table.

FIG. 7 is a schematic view of a parameter information table.

FIG. 8 is a schematic view of an aggregation result information table.

FIG. 9 is a schematic view of an average error information table.

FIG. 20 is a schematic view showing the aggregation period setting process.

FIG. 21 is a schematic view showing the operation implementation period estimation process.

FIG. 22 is another schematic view showing the operation implementation period estimation process.

FIG. 23 is another schematic view showing the operation implementation period estimation process.

FIG. 25 is a schematic view showing a typical input screen.

DESCRIPTION OF EMBODIMENTS

Figure 3:
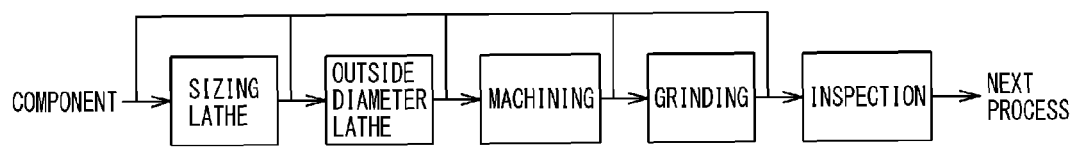
FIG. 3 is a schematic view of a typical operation process on a manufacturing floor.
Figure 10:
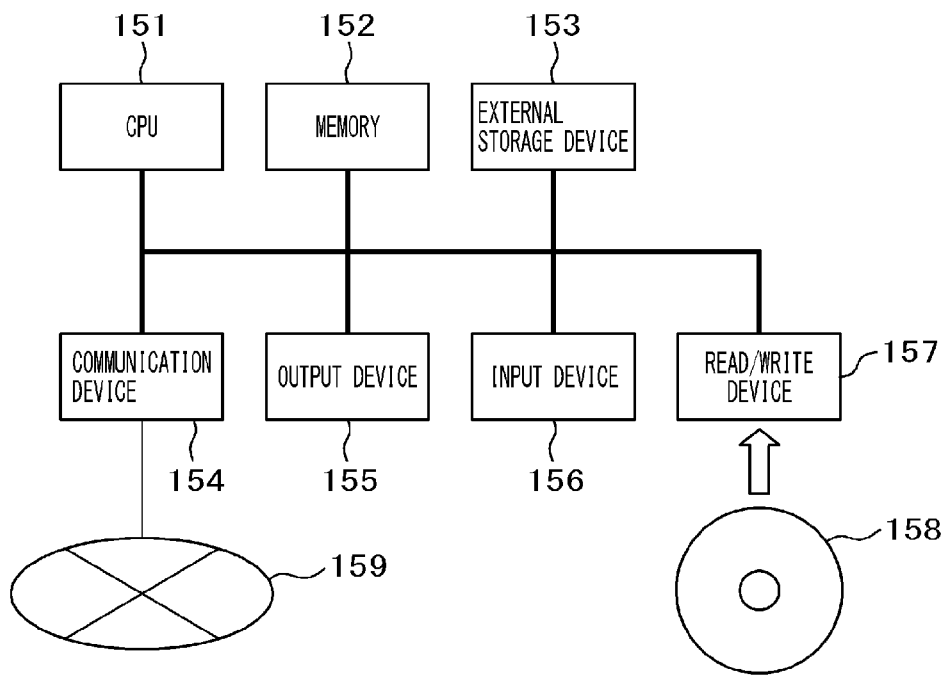
FIG. 10 is a schematic view of a computer.

The present invention is aimed at calculating operation times using operation result information from the manufacturing floor. FIG. 3 shows an example of the operation process flow on a manufacturing floor. What follows is a detailed explanation of the present invention that uses this example as the target.

As shown in FIG. 3, the target operation process flow on the manufacturing floor includes such operation processes as a sizing lathe process and an outside diameter lathe process, and a plurality of product types are manufactured thereby. The operation time of each operation process varies from one product type to another. The operation time calculation device of the present invention may calculate the operation time of each operation process of each product type from operation result information, for example, and offers the results of the calculation to the user.

FIG. 1 is a functional block diagram of the operation time calculation device. As illustrated, the operation time calculation device includes a storage unit 110, a control unit 120, an input unit 130, a display unit 140, and a communication unit 150.

The storage unit 110 includes an operation result information storage region 111, a work time information storage region 112, an operation time information storage region 113, a parameter information storage region 114, an aggregation result information storage region 115, and an average error information storage region 116.

Regarding the operation actually implemented on the manufacturing floor, the operation result information storage region 111 stores operation result information identifying component numbers, product types of the components, operation process numbers of the components, operation processes for the components, and the operation start dates and times and operation end dates and times of the operation processes for the components. For example, this embodiment stores an operation result information table such as one shown in FIG. 4. As illustrated, the operation result information table has a component number column 111a, a product type column 111b, an operation process number column 111c, an operation process column 111d, an operation start date and time column 111e, and an operation end date and time column 111f. The component number column 111a stores information identifying the components involved. The product type column 111b stores information identifying the types of the products identified in the component number column 111a. The operation process number column 111c stores information identifying the serial numbers of the operation processes for the components identified in the component number column 111a. The operation process column 111d stores information identifying the operation processes corresponding to the operation process numbers identified in the operation process number column 111c regarding the components identified in the component number column 111a. The operation start date and time column 111e and the operation end date and time column 111f store information identifying the operation start dates and times and the operation end dates and times, respectively, of the operation process numbers identified in the operation process number column 111c regarding the components identified in the component number column 111a. The data records in the operation result information table are sorted in ascending order of the component number and of the operation process when stored in the operation result information storage region 111. Here, there may occur losses of the data of operation start dates and times or operation end dates and times due to omissions and delays in recording the operation results from the manufacturing floor.

Returning to FIG. 1, the work time information storage region 112 stores the work time information about equipment and workers. For example, with the present embodiment, a work time information table such as one shown in FIG. 5 is stored. As illustrated, the work time information table has a date column 112a, an equipment/worker number column 112b, an assigned process column 112c, and a work time column 112d. The date column 112a stores information identifying the dates involved. The equipment/worker number column 112b stores information identifying the equipment and/or workers involved. The assigned process column 112c stores information identifying the processes assigned to the equipment and/or workers identified in the equipment/worker number column 112b on the dates identified in the date column 112a. The work time column 112d stores information identifying the times worked during the processes identified in the assigned process column 112c by the equipment and/or worker identified in the equipment/worker number column 112b on the dates identified in the date column 112a.

Returning to FIG. 1, the operation time information storage region 113 stores operation time information identifying the product types involved, operation process numbers of the product types, operation processes for the product types, operation times of the operation processes for the product types, and an operation time conversion coefficient for the operation process for each of the product types. With this embodiment, for example, an operation time information table such as one shown in FIG. 6 is stored. As illustrated, the operation time information table has a product type column 113a, an operation process number column 113b, an operation process column 113c, an initially set operation time column 113d, and an operation time conversion coefficient column 113e. The product type column 113a stores information identifying the product types involved. The operation process number column 113b stores information identifying the serial numbers of the operation processes for the product types identified in the product type column 113a. The operation process column 113c stores information identifying the operation processes corresponding to the operation process numbers identified in the operation process number column 113b regarding the product types identified in the product type column 113a. The initially set operation time column 113d stores information identifying the operation times of the processes corresponding to the operation process numbers identified in the operation process number column 113b regarding the product types identified in the product type column 113a. Here, the initially set operation time is the initial value used by a per-period operation time conversion unit 124, to be discussed later, in converting operation times. Whereas there are methods for theoretically or empirically setting the initially set operation time based on the specification information about the product type of interest, for example, the present invention is not limited to any of these methods. The operation time conversion coefficient column 113e stores information identifying the operation time conversion coefficients for the operations corresponding to the operation process numbers identified in the operation process number column 113b regarding the product types identified in the product type column 113a. Here, the initial value of the operation time conversion coefficient is 1, which may be changed in a process performed by the operation time conversion unit, to be discussed later. With regard to this example, it is assumed that one operation time conversion coefficient corresponds to one operation process of one product type and that the operation time after conversion is calculated by multiplying the operation time conversion coefficient by the initially set operation time. However, the number of operation time conversion coefficients and the method of conversion are not limitative of the present invention. For example, there may be two conversion coefficients (e.g., "a" and "b"), and the operation time after conversion may be calculated by multiplying "a" by the initially set operation time, plus "b."

Returning to FIG. 1, the parameter information storage region 114 stores parameter information identifying the execution conditions for an operation time calculation process. With this embodiment, for example, a parameter information table such as one shown in FIG. 7 is stored. As illustrated, the parameter information table has an item column 114a and a value column 114b. The item column 114a stores information identifying parameter items. What is stored here is an "aggregation target process," an "aggregation start date and time," an "aggregation end date and time," an "aggregation unit period," and a "conversion iteration count upper limit" as the information identifying the items. The value column 114b stores information identifying the values regarding the items identified in the item column 114a.

Returning to FIG. 1, the aggregation result information storage region 115 stores aggregation result information identifying aggregation period start dates and times, aggregation period end dates and times, total work times of the aggregation periods involved, total operation times before conversion, and total operation times after conversion. With this embodiment, for example, an aggregation result information table such as one shown in FIG. 8 is stored. As illustrated, the aggregation result information table has an aggregation period start date and time column 115a, an aggregation period end date and time column 115b, a total work time column 115c, a before-conversion total operation time column 115d, and an after-conversion total operation time column 115e. The aggregation period start date and time column 115a stores information identifying the start date and time of each of the aggregation periods. The aggregation period end date and time column 115b stores information identifying the end date and time of each aggregation period. The total work time column 115c stores information identifying the total work time of the aggregation period in question as the result of processing by a per-period work time calculation unit 112, to be discussed later. The before-conversion total operation time column 115d stores information identifying the total work time of the aggregation period in question before operation time conversion as the result of processing by a per-period operation time calculation unit 124, to be discussed later. The after-conversion total operation time column 115e stores information identifying the total work time of the aggregation period in question after operation time conversion as the result of processing by the per-period operation time calculation unit 124, to be discussed later.

Returning to FIG. 1, the average error information storage region 116 stores information identifying the errors between per-period work times and per-period operation times as the result of processing by an error evaluation and coefficient calculation unit 125, to be discussed later. With this embodiment, for example, an average error information table such as one shown in FIG. 9 is stored. As illustrated, the average error information table has an item column 116a and a value column 116b. The item column 116a stores information identifying the items involved. What is stored here is an "error before conversion" and an "error after conversion" as the information identifying the items. The value column 116b stores information identifying the values corresponding to the items identified in the item column 116a.

Returning to FIG. 1, the control unit 120 includes an aggregation period setting unit 121, a per-period work time calculation unit 122, an operation implementation period estimation unit 123, a per-period operation time calculation unit 124, and an error evaluation and coefficient calculation unit 125.

The aggregation period setting unit 121 acquires aggregation start dates and times, aggregation end dates and times, and aggregation unit periods based on the parameter information, and performs the process of setting the start date and time and the end date and time of each aggregation period.

Based on the results of the processing by the aggregation period setting unit 121 and on the work time information, the per-period work time calculation unit 122 performs the process of calculating the total work time of each aggregation period and the process of storing the results of the calculation into the aggregation result information storage region 115.

The operation implementation period estimation unit 123 performs the process of estimating the operation implementation period of each operation process for each component based on the operation result information.

Based on the results of the processing by the aggregation period setting unit 121, on the operation result information and on the operation time information, the per-period operation time calculation unit 124 performs the process of calculating the total operation time of each aggregation period and the process of storing the results of the calculation into the aggregation result information storage region 115.

Based on the results of the processing by the per-period work time calculation unit 122 and by the per-period operation time calculation unit 124, the error evaluation and coefficient calculation unit 125 performs the process of calculating an average error between the total work time and the total operation time in each aggregation period, the process of calculating the operation time coefficient in a manner minimizing the error, and the process of storing the results of the calculation into the average error information storage region 116.

Returning to FIG. 1, the input unit 130 accepts input of the information to be set in the parameter information storage region 114 from the user of the operation time calculation device.

The display unit 140 outputs the information from the storage unit 110. For example, the display unit 140 performs the process of displaying the information from the aggregation result information storage region 115 and average error information storage region 116 in the storage unit 110.

The communication unit 150 transmits and receives information via a network.

Figure 2:
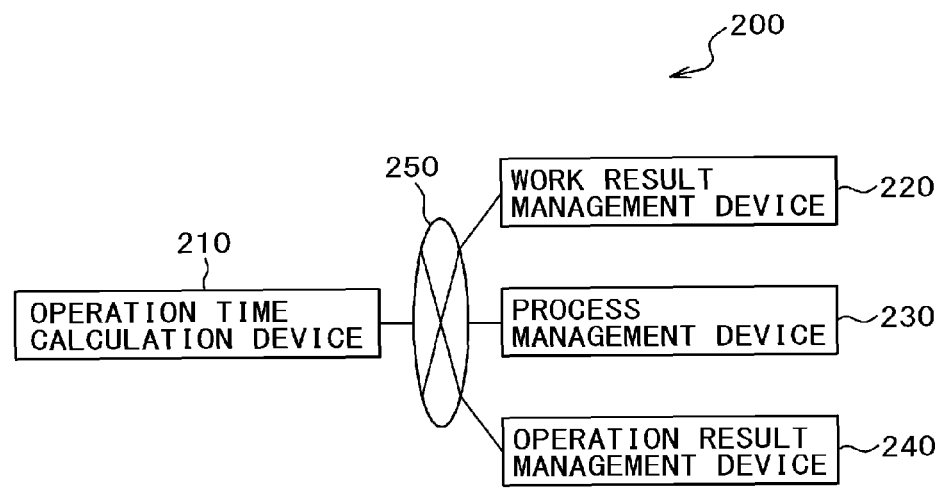
FIG. 2 is a schematic view of the operation time calculation device.

FIG. 2 is a schematic view of an operation time calculation device 200 as one embodiment of the present invention. As illustrated, the operation time calculation device 200 includes an operation time calculation device 210, a work result management device 220, a process management device 230, and an operation result management device 240. These devices can transmit and receive information therebetween via a network 250.

The work result management device 220 accepts input of the work result information about equipment and workers from the user of the device 220 and, at a predetermined point in time or in response to a request from the operation time calculation device 210, transmits the accepted work result information to the operation time calculation device 210.

The process management device 230 accepts input of process management information such as the product types of components, operation process numbers, operation processes, and operation time information from the user of the device 230 and, at a predetermined point in time or in response to a request from the operation time calculation device 210, transmits the accepted process management information to the operation time calculation device 210.

The operation result management device 240 accepts input of operation result information from the equipment and workers deployed on the manufacturing floor and, at a predetermined point in time or in response to a request from the operation time calculation device 210, transmits the accepted operation result information to the operation time calculation device 210.

The operation time calculation device 210 described above can be implemented in the form of a general-purpose computer that includes a CPU (Central Processing Unit) 151, a memory 152, an external storage device 153 such as HDD (Hard Disk Drive), a read/write device 157 that reads and writes information from and to a portable storage medium 158 such as CD (Compact Disk) or DVD (Digital Versatile Disk), an input device 156 such as a keyboard and a mouse, an output device 155 such as a display, and a communication device 154 such as NIC (Network Interface Card) for connecting to a communication network 159.

For example, the storage unit 110 can be implemented by the CPU 151 using the memory 152 or external storage device 153. The control unit 120 can be implemented when relevant programs stored in the external storage device 153 are loaded into the memory 152 and executed by the CPU 151. The input unit 130 can be implemented by the CPU 151 using the input device 156. The display unit 140 can be implemented by the CPU 151 using the output device 155. The communication unit 150 can be implemented by the CPU 151 using the communication device 154.

The relevant programs may be written from the storage device 158 to the external device 153 via the read/write device 157 or downloaded thereto from the network via the communication device 154. From the external storage device 153, the programs may be loaded into the memory 152 and executed by the CPU 151. Alternatively, the programs may be loaded directly into the memory 152 from the storage medium 158 via the read/write device 157 or from the network 159 via the communication device 154, and executed by the CPU 151.

The operation time calculation device 210 described above performs an operation time calculation process, to be discussed below, in which the operation time is calculated in a manner minimizing the error between the work time and the operation time in each aggregation period. FIGS. 11 through 18 are flowcharts showing the operation time calculation process, and FIGS. 19 through 24 are schematic views of this process. The embodiment of the present invention is explained below in detail with reference to FIGS. 11 through 24.

Figure 19:
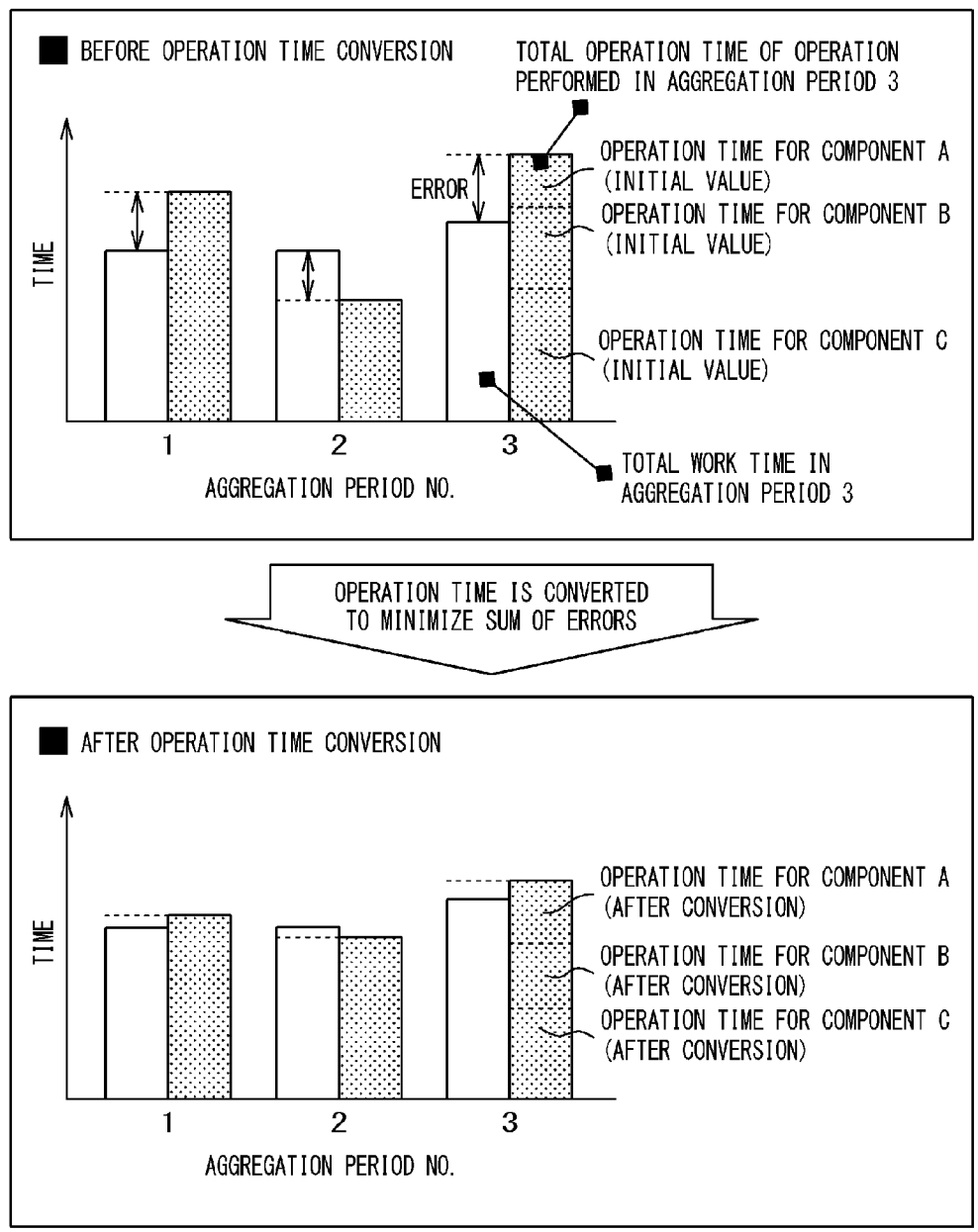
FIG. 19 is a schematic view showing the operation time calculation process.

FIG. 19 is a schematic view showing the operation time calculation process. In this process, the operation time is calculated in a manner minimizing the error between the total work time and the total operation time in the aggregation period of interest. First, on the basis of a predetermined aggregation unit period, aggregation periods (indicated by 1, 2, 3 on the horizontal axis of the drawing) are established, and the total work time and total operation time of each aggregation period are calculated. Here, the total operation time is calculated by totaling the initially set operation time for the operation implemented in the aggregation periods involved. The upper illustration in FIG. 19 is a schematic diagram showing the results of calculating the total work time and the total operation time of each aggregation period. Next, an error is calculated between the total work time and the total operation time of each aggregation period, and the operation time is converted in a manner minimizing the sum of the errors from all aggregation periods. The lower illustration in FIG. 19 is a schematic diagram showing the results of calculating the total operation time of each aggregation period using the operation time after conversion.

Figure 11:
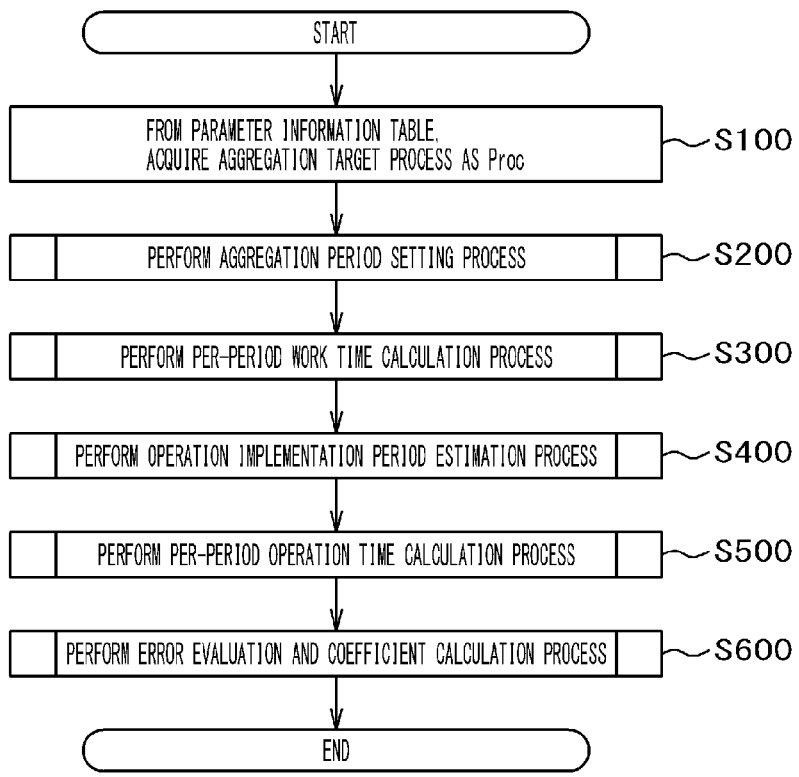
FIG. 11 is a flowchart showing an operation time calculation process.

FIG. 11 is a flowchart showing the operation time calculation process performed by the control unit 120 mentioned above.

In step S100, the aggregation target process is acquired from the parameter information table stored in the parameter information storage region 114, and the value involved is substituted into an operation process Proc. Here, multiple operation processes may be set in Proc.

In step S200, an aggregation period setting process is performed. Details of the process will be discussed later.

In step S300, a per-period work time calculation process is performed. Details of the process will be discussed later.

In step S400, an operation implementation period estimation process is performed. Details of the process will be discussed later.

In step S500, a per-period operation time calculation process is performed. Details of the process will be discussed later.

In step S600, an error estimation and coefficient calculation process is performed. Details of the process will be discussed later.

The aggregation period setting process of step 200 in FIG. 11 is explained below in detail. In this process, the start dates and times and the end dates and times of the aggregation periods involved are established based on the aggregation start dates and times, aggregation end dates and times, and aggregation unit period in the parameter information.

FIG. 20 is a schematic view showing the aggregation period setting process of step 200. In FIG. 20, reference characters $T_{start}$ and $T_{End}$ stand for the aggregation start date and time and the aggregation end date and time of the aggregation unit, respectively, and $\Delta T$ denotes the aggregation unit period. Starting from $T_{start}$, aggregation periods $R_1$, $R_2$, $R_3$, etc., are established at intervals of $\Delta T$, and the process is terminated when the aggregation end date and time $T_{End}$ is exceeded by the end date and time $T_{End,k}$ of an aggregation period $R_k$. Here, the aggregation period $R_j$ is assumed to have, as its attribute values, a start date and time $T_{start,j}$, an end date and time $T_{End,j}$, a total work time $totAT_j$, and a total operation time $totST_j$.

Figure 12:
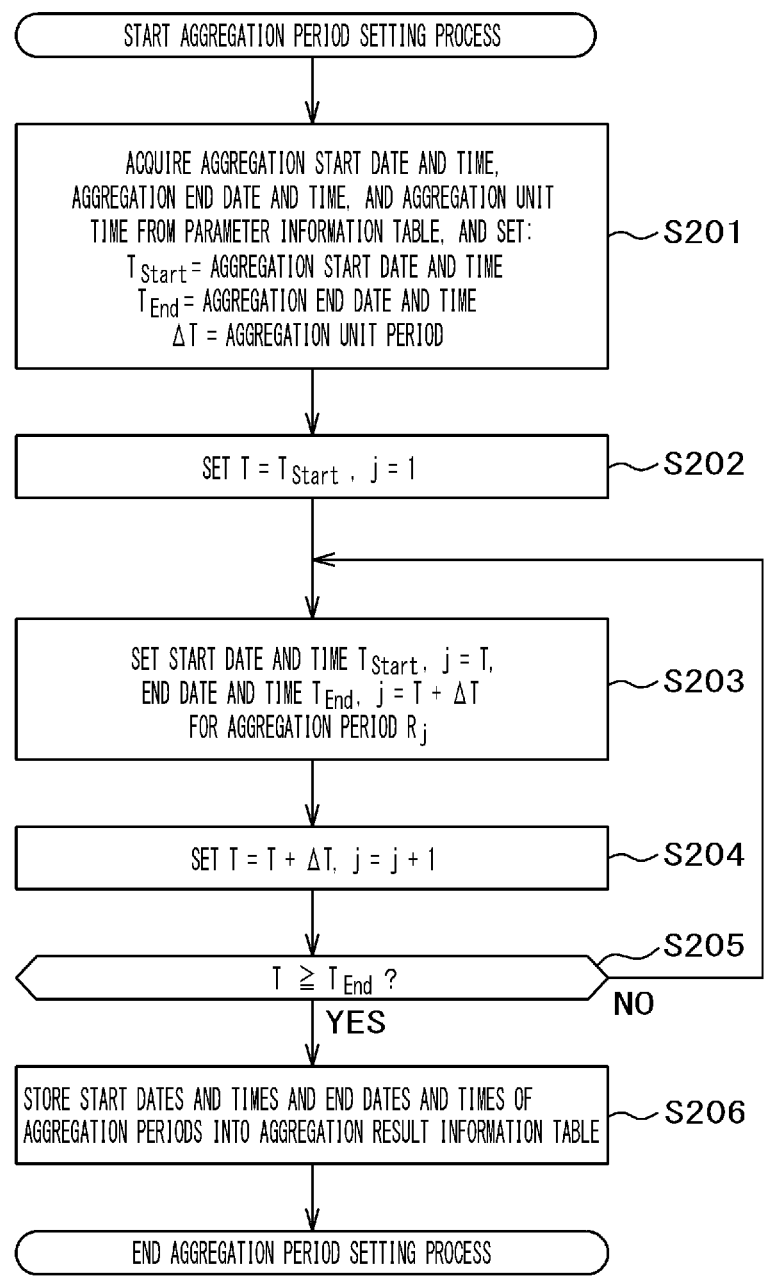
FIG. 12 is a flowchart showing an aggregation period setting process.

FIG. 12 is a flowchart detailing the aggregation period setting process of step 200.

In step S201, an aggregation start date and time, an aggregation end date and time, and an aggregation unit period are acquired from the parameter information table stored in the parameter information storage region 114, and the acquired values are substituted into $T_{start}$, $T_{End}$, and $\Delta T$, respectively.

In step S202, $T_{start}$ is substituted into the date and time T, and "1" is substituted into a counter "j."

In step S203, T is substituted into the start date and time $T_{start,j}$ of the aggregation period $R_j$, and $T+\Delta T$ into the end date and time $T_{End,j}$ of the aggregation period $R_j$.

In step S204, $T+\Delta T$ is substituted into the date and time T, and j+1 into the counter "j."

In step S205, it is determined whether the date and time T is larger than the aggregation end date and time $T_{End}$. Specifically, if T is determined to be larger than or equal to $T_{End}$, the process is terminated; if T is determined to be smaller than $T_{End}$, then step S203 is reached.

In step S206, the start dates and times and the end dates and times of the aggregation periods involved are stored into the aggregation period start date and time column 115a and the aggregation period end date and time column 115b, respectively, in the aggregation result information table of FIG. 8.

The per-period work time calculation process of step S300 in FIG. 11 is explained below in detail. In this process, the total work times of the aggregation periods involved are calculated based on the results of the aggregation period setting process mentioned above and on the work time information stored in the work time information storage region 112.

Figure 13:
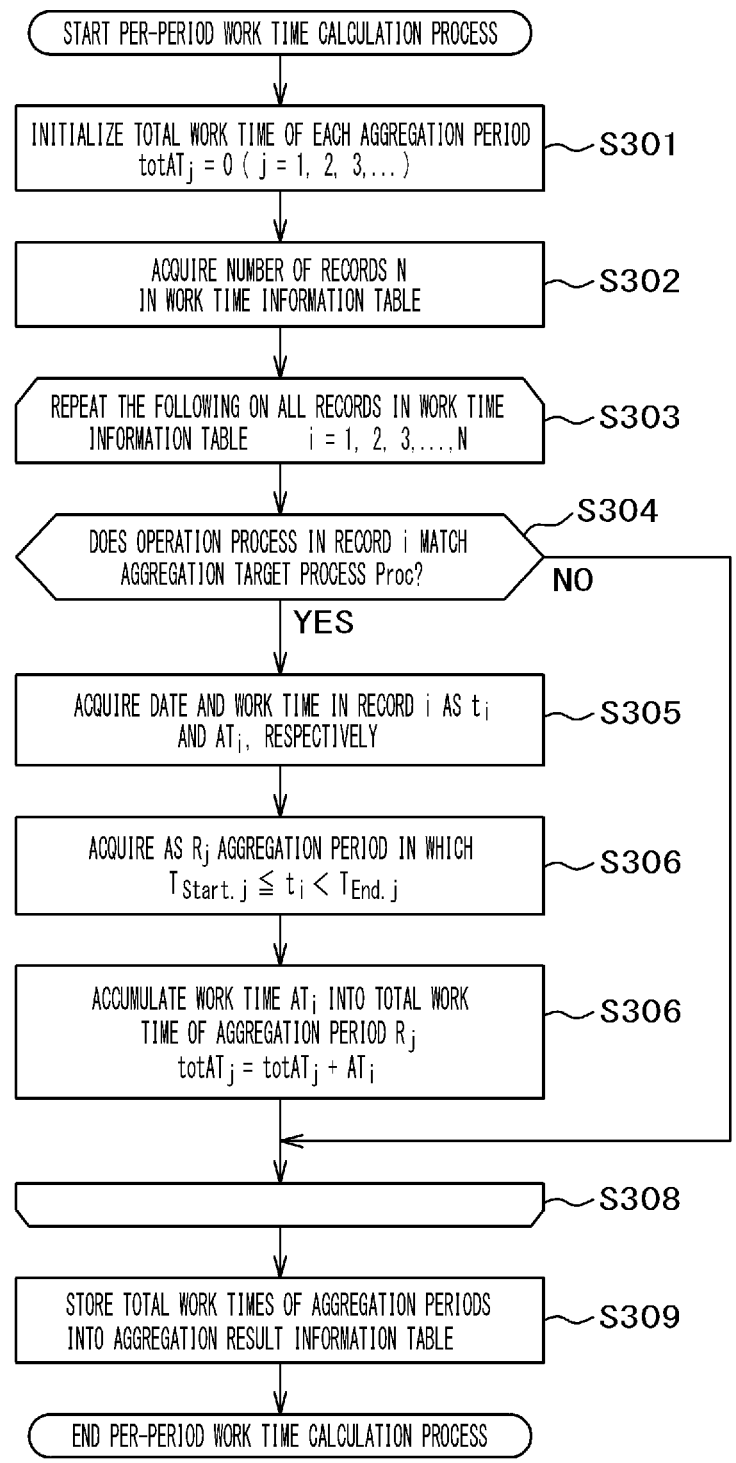
FIG. 13 is a flowchart showing a per-period work time calculation process.

FIG. 13 is a flowchart detailing the per-period work time calculation process of step S300.

In step S301, the total work time of each aggregation period is initialized. Specifically, "0" is substituted into the total work time $totAT_j$ of the aggregation period $R_j$, and this step is performed on all aggregation periods.

In step S302, the number of records in the work time information table is acquired and substituted into N.

Steps S303 through S308 are repeated from 1 to N on a counter "i."

In step S304, the operation process of a record "i" in the work time information table (i-th record from the top of the table) is acquired. It is then determined whether the acquired operation process matches the aggregation target process Proc. If the acquired operation process is determined to match the aggregation target process Proc, step S305 is reached. In the event of a mismatch, the acquired operation process is not considered the target, and step S308 is reached.

In step S305, the date of the record "i" in the work time information table is acquired and substituted into the date $t_i$ to acquire the work time. The acquired work time is substituted into a work time $AT_i$.

In step S306, out of all aggregation periods, the aggregation period Rj is acquired in which the aggregation period start date and time $T_{Start,j} \leq$ date $t_i <$ aggregation period end date and time $T_{End,j}$.

In step S307, the work time $AT_j$ is accumulated into the total work time $totAT_j$ of the aggregation period $R_j$.

In step S309, the total work times of the aggregation periods are stored into the total work time column 115c in the above-mentioned aggregation result information table of FIG. 8.

The operation implementation period estimation process of step S400 in FIG. 11 is explained below in detail. This process involves estimating the start date and time and the end date and time of the operation implementation period for the operation corresponding to each record of the operation result information stored in the operation result information storage region 111.

FIGS. 21 through 23 are schematic views of the operation implementation period estimation process in step S400.

FIG. 21 shows the case where there are no omissions of the operation start date and time or the operation end date and time in a given record "i" of the operation result information. In this case, the start date and time $t_{Start,i}$ of the operation implementation period in the record "i" is the date and time at which the outside diameter lathe process is started, and the end date and time $t_{End,i}$ of the operation implementation period in the record "i" is the date and time at which the outside diameter lathe process is completed.

FIG. 22 shows the case where there is an omission of the operation start date and time in the record "i." In this case, the start date and time $t_{Start,i}$ of the operation implementation period in the record "i" is estimated from the operation end date and time of the sizing lathe process preceding the outside diameter lathe process. If the operation end date and time of the sizing lathe process is also found omitted, the estimation is based on the operation start date and time of the sizing lathe process. In this manner, the start date and time $t_{Start,i}$ of the operation implementation period is estimated using the operation start date and time or the operation end date and time of the preceding operation.

FIG. 23 shows the case where there is an omission of the operation end date and time in the record "i." In this case, the end date and time $t_{End,i}$ of the operation implementation period in the record "i" is estimated from the operation start date and time of the machining process subsequent to the outside diameter lathe process. If the start date and time of the machining process is also found omitted, the estimation is based on the operation end date and time of the machining process. In this manner, the end is estimated using the operation start date and time or the operation end date and time of the subsequent operation.

Figure 14:
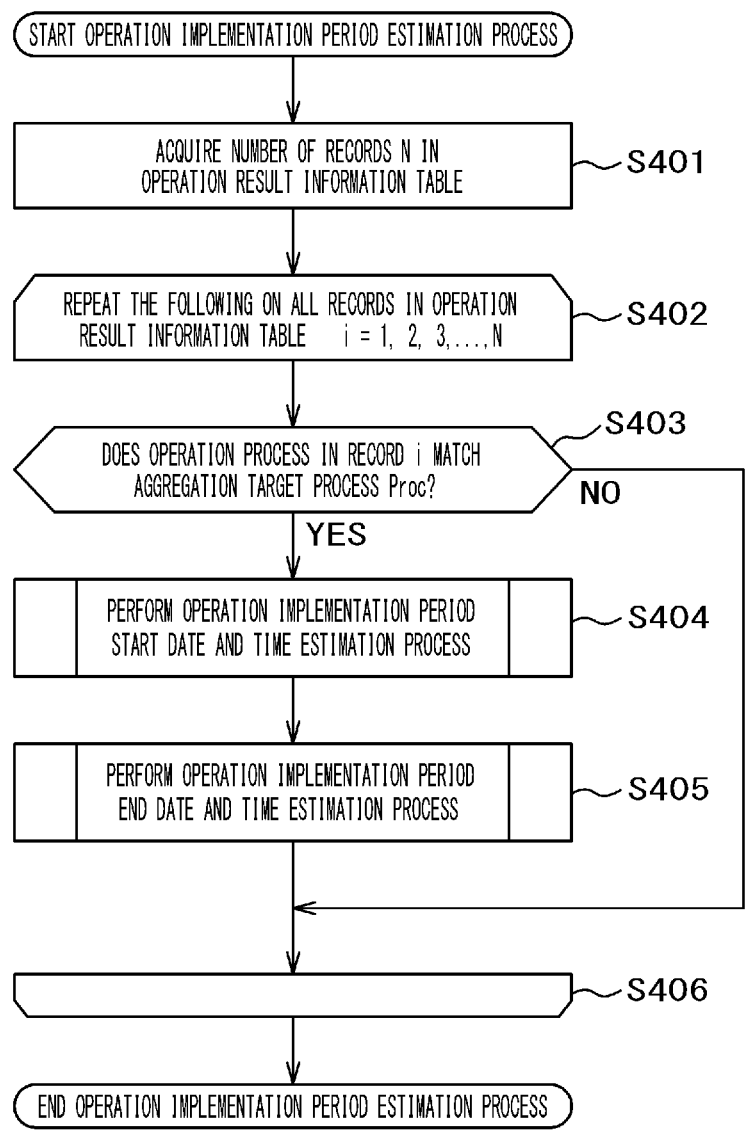
FIG. 14 is a flowchart showing an operation implementation period estimation process.

FIG. 14 is a flowchart detailing the operation implementation period estimation process in step S400.

In step S401, the number of records in the operation result information table is acquired and substituted into N.

Steps S402 through S406 are repeated from 1 to N on the counter "i."

In step S403, the operation process of the record "i" in the operation result information table (i-th record from the top of the table) is acquired. It is then determined whether the acquired operation process matches the aggregation target process Proc. If the acquired operation process is determined to match the aggregation target process Proc, step S404 is reached. In the event of a mismatch, step S406 is reached.

In step S404, the start date and time of the operation implementation period in the record "i" is estimated. Details of this step will be discussed later.

In step S405, the end date and time of the operation implementation period in the record "i" is estimated. Details of this step will be discussed later.

Figure 15:
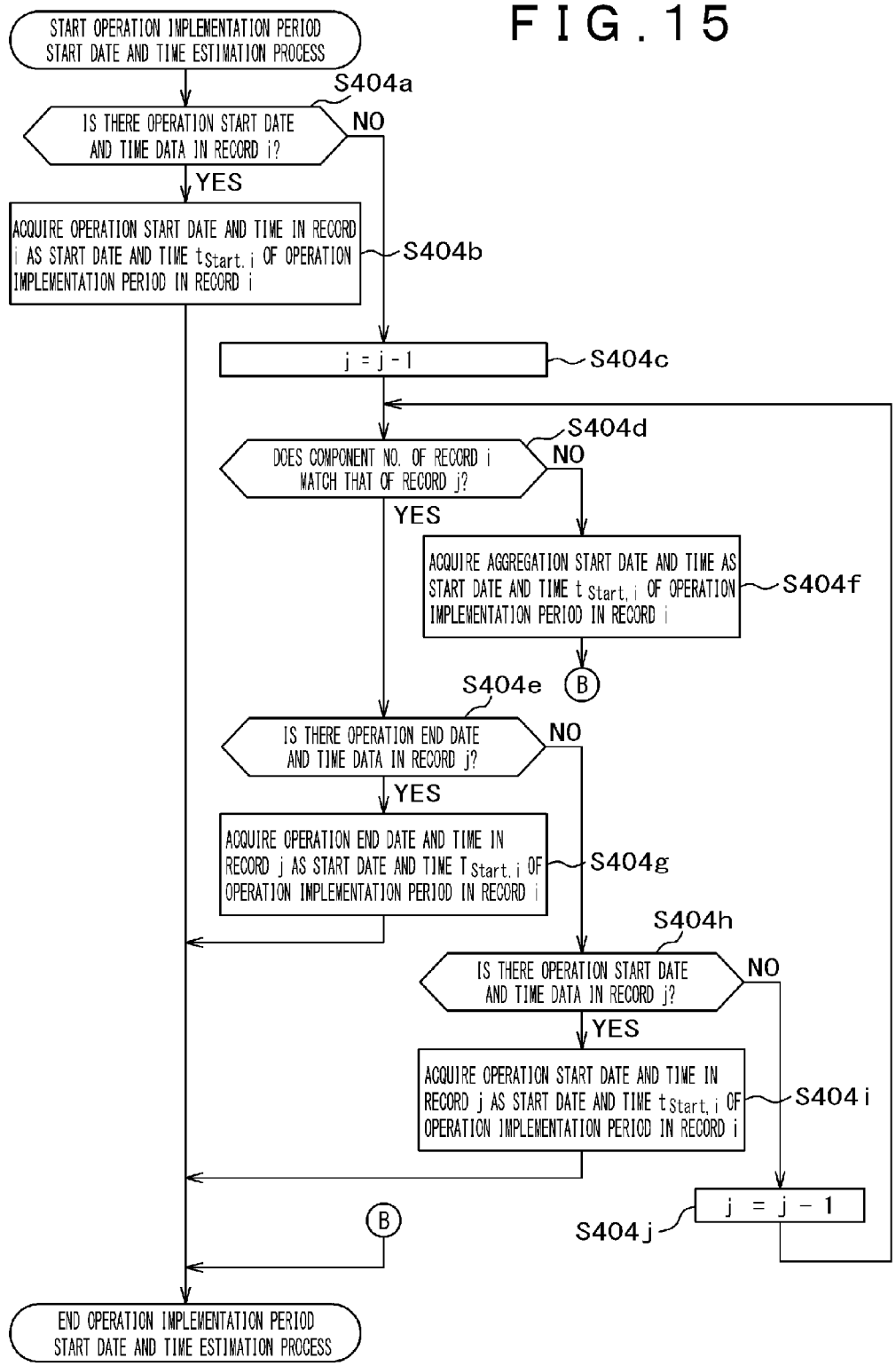
FIG. 15 is a flowchart showing an operation implementation period start date and time estimation process.

FIG. 15 is a flowchart detailing the operation implementation period start date and time estimation process in step S404 of FIG. 14. In this process, the operation implementation period start date and time is estimated where the operation start date and time is found omitted, as shown in FIG. 22.

In step S404a, it is determined whether there is data in the operation start date and time in the record "i." If data is determined to exist in the operation start date and time in the record "i," step S404b is reached. If there is no data in the operation start date and time, step S404c is reached.

In step S404b, the operation start date and time in the record "i" is acquired and substituted into the start date and time $t_{Start,i}$ of the operation implementation period in the record "i."

In step S404c, i−1 is substituted into the counter "j."

In step S404d, it is determined whether the component number of the record "i" matches that of the record "j." If the component number of the record "i" is determined to match that of the record "j," step S404e is reached. In the event of a mismatch, step S404f is reached.

In step S404e, it is determined whether the operation end date and time column in the record "j" is blank. If the operation end date and time column in the record "j" is not found blank, step S404g is reached. If the column is found blank, step S404h is reached.

In step S404f, the aggregation start date and time in the parameter information table is acquired and substituted into the start date and time $t_{Start,i}$ of the operation implementation period in the record "i."

In step S404g, the operation end date and time in the record "j" is acquired and substituted into the start date and time $t_{Start,i}$ of the operation implementation period in the record "i."

In step S404h, it is determined whether the operation start date and time column in the record "j" is blank. If the operation start date and time column in the record "j" is not found blank, step S404i is reached. If the column is found blank, step S404j is reached.

In step S404i, the operation start date and time in the record "j" is acquired and substituted into the start date and time $t_{Start,i}$ of the operation implementation period in the record "i."

In step S404j, j−1 is substituted into the counter "j."

Figure 16:
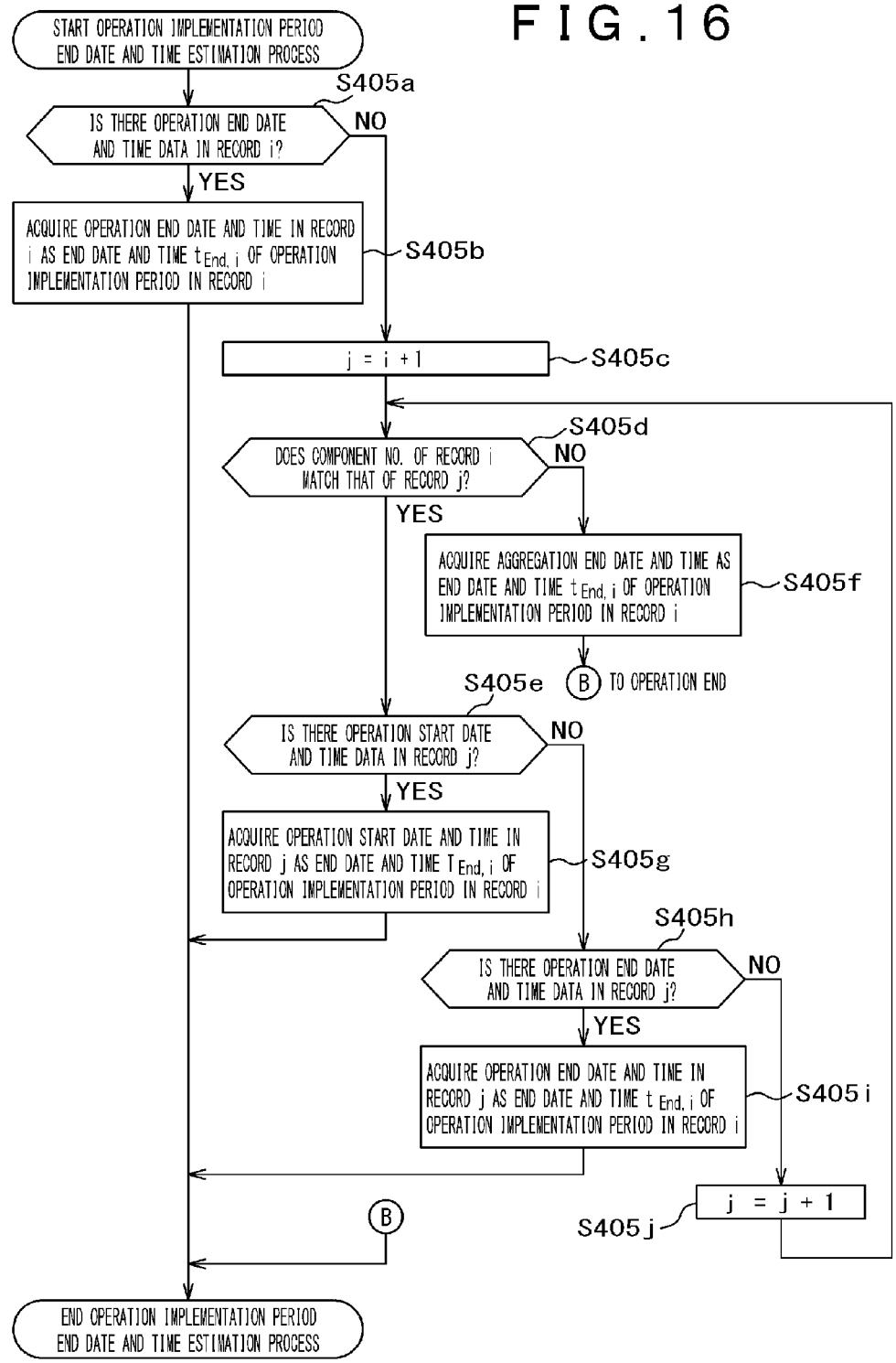
FIG. 16 is a flowchart showing an operation implementation period end date and time estimation process.

FIG. 16 is a flowchart detailing the operation implementation period end date and time estimation process in step S405 of FIG. 14. In this process, the operation implementation period end date and time is estimated where there is an omission of the operation end date and time, as shown in FIG. 23.

In step S405a, it is determined whether the operation end date and time column in the record "i" is blank. If the operation end date and time column in the record "i" is not found blank, step S405b is reached. If the column is found blank, step S405c is reached.

In step S405b, the operation end date and time in the record "i" is acquired and substituted into the end date and time $t_{End,i}$ of the operation implementation period in the record "i."

In step S405c, i+1 is substituted into the counter "j."

In step S405d, it is determined whether the component number of the record "i" matches that of the record "j." If the component number of the record "i" is determined to match that of the record "j," step S405e is reached. In the event of a mismatch, step S405f is reached.

In step S405e, it is determined whether the operation start date and time column in the record "j" is blank. If the operation start date and time column in the record "j" is not found blank, step S405g is reached. If the column is found blank, step S405h is reached.

In step S405f, the aggregation end date and time in the parameter information table is acquired and substituted into the end date and time $t_{End,i}$ of the operation implementation period in the record "i."

In step S405g, the operation start date and time in the record "j" is acquired and substituted into the end date and time $t_{End,i}$ of the operation implementation period in the record "i."

In step S405h, it is determined whether the operation start date and time column in the record "j" is blank. If the operation start date and time column in the record "j" is not found blank, step S405i is reached. If the column is found blank, step S405j is reached.

In step S405i, the operation start date and time in the record "j" is acquired and substituted into the end date and time $t_{End,i}$ of the operation implementation period in the record "i."

In step S405j, j+1 is substituted into the counter "j."

The per-period operation time calculation process of step S500 in FIG. 11 is explained below in detail. In this process, the total operation times of the aggregation periods are calculated based on the results of the aggregation period setting process described above and on the results of the operation implementation period estimation process above.

Figure 24:
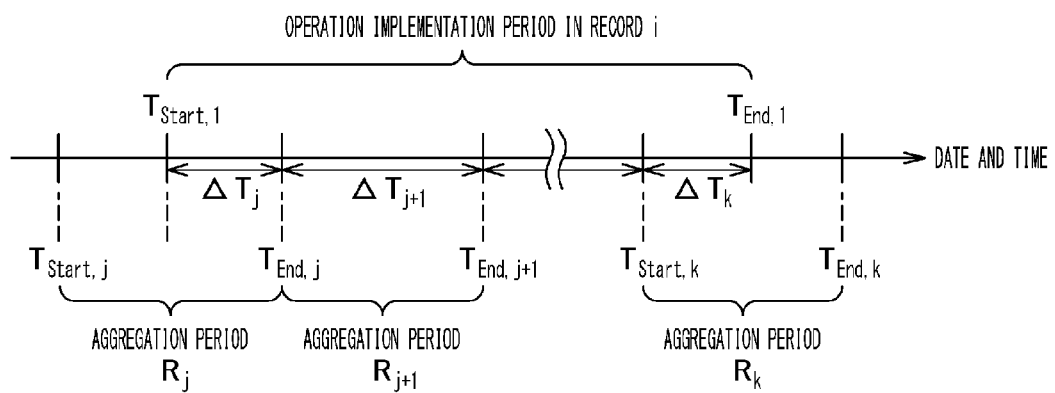
FIG. 24 is a schematic view showing a per-period operation time aggregation process.

FIG. 24 is a schematic view of the per-period operation time calculation process in step S500. As illustrated, where the range of the operation implementation period $t_{Start,i}$ through $t_{End,i}$ of a given record "i" in the operation result information overlaps with the aggregation periods $R_j$, $R_{j+1}, \ldots R_k$, the operation time $ST_i$ in the record "i" is read from the initially set operation time 113d of the record in question in the operation time information storage region 113, and is distributed to the total operation times $totST_j$, $totST_{j+1}, \ldots, totST_k$ of the aggregation periods $R_j$, $R_{j+1}, \ldots, R_k$. Specifically, out of the operation implementation period $t_{Start,i}$ through $t_{End,i}$, a period segment overlapping with the aggregation period $R_j$ is given as $\Delta T_j$, and $ST_i \times \Delta T_j/(t_{End,i}-t_{Start,i})$ is accumulated into $totST_j$.

Figure 17:
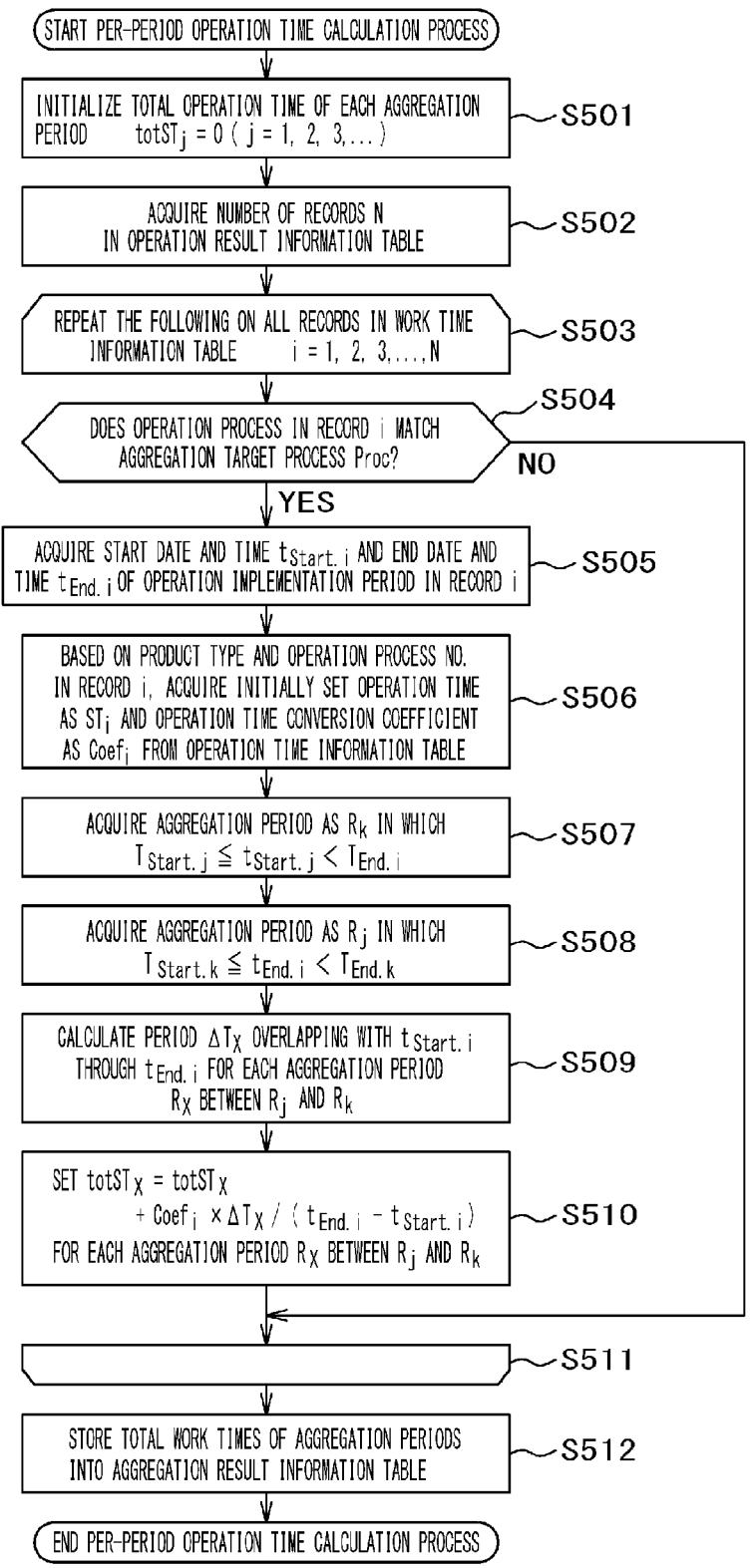
FIG. 17 is a flowchart showing a per-period operation time calculation process.

FIG. 17 is a flowchart detailing the per-period operation time calculation process of step S500 in FIG. 11.

In step S501, the total operation time of each aggregation period is initialized. Specifically, "0" is substituted into the total operation time $totST_j$ of the aggregation period $R_j$, and this step is performed on all aggregation periods.

In step S502, the number of records in the operation result information table is acquired and substituted into N.

Steps S503 through S511 are repeated from 1 to N on the counter "i."

In step S504, the operation process in the record "i" in the operation result information table (i-th record from the top of the table) is acquired. It is then determined whether the acquired operation process matches the aggregation target process Proc. If the acquired operation process is determined to match the aggregation target process Proc, step S505 is reached. In the event of a mismatch, step S511 is reached.

In step S505, the start date and time and the end date and time in the record "i" in the operation result information table are acquired, and substituted into $t_{Start,i}$ and $t_{End,i}$, respectively.

In step S506, based on the product type and operation process number in the record "i," the initially set operation time and the operation time conversion coefficient corresponding to the operation process number of the product type in question are acquired from the operation time information table, and are substituted into $ST_i$ and $Coef_i$, respectively.

In step S507, out of all aggregation periods, the aggregation period $R_j$ is acquired in which the aggregation period start date and time $T_{Start,j}$<operation implementation period start date and time $t_{Start,i}$≤aggregation period end date and time $T_{End,j}$.

In step S508, out of all aggregation periods, the aggregation period $R_k$ is acquired in which the aggregation period start date and time $T_{Start,k}$≤operation implementation period end date and time $t_{End,i}$<aggregation period end date and time $T_{End,k}$.

In step S509, within each aggregation period $R_x$ between the aggregation period $R_j$ and the aggregation period $R_k$, a period $\Delta T_x$ overlapping with $t_{Start,i}$ through $t_{End,i}$ is calculated. On the basis of the following expression, an operation time distribution rate $\alpha_x$ is calculated: $\alpha_x$=(period overlapping with $R_x$ between $t_{Start,i}$ and $t_{End,i}$)/(period between $t_{Start,i}$ and $t_{End,i}$).

In step S510, for each aggregation period $R_x$ between the aggregation period $R_j$ and the aggregation period $R_k$, the value of $Coef_i \times ST_i \times \Delta T_x/(t_{End,i}-t_{Start,i})$ is accumulated into the total operation time $totST_x$.

In step S512, the total operation times of the aggregation periods are stored into the before-conversion total operation time column 115d in the aggregation result information storage region 115 of FIG. 8. However, if this process is invoked during a per-period operation time aggregation process of step S608 in the error estimation and coefficient calculation process of step S600, to be discussed later, the values are stored into the after-conversion total operation time column 115e in the aggregation result information table of FIG. 8.

Figure 18:
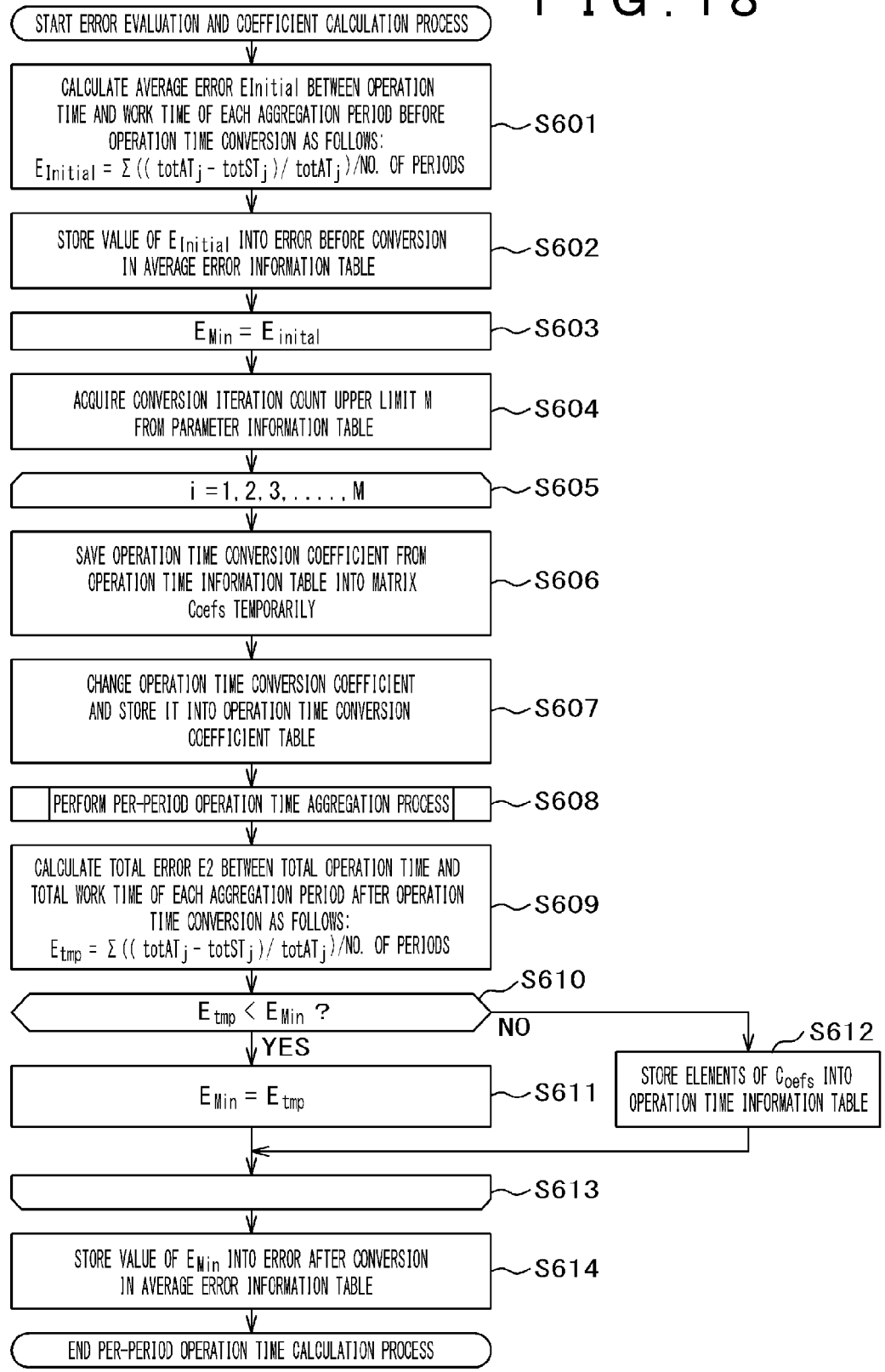
FIG. 18 is a flowchart showing an error estimation and coefficient calculation process.

FIG. 18 is a flowchart detailing the error estimation and coefficient calculation process of step S600 in FIG. 11. In this process, based on the results of the per-period work time calculation process described above and on the results of the per-period operation time calculation process above, an average error is calculated between the work time and the operation time of each of the aggregation periods, and the operation time conversion coefficient is calculated in such a manner that its value minimizes the average error. Here, there are various methods for calculating the operation time conversion coefficient, including the method of repeatedly changing the operation time conversion coefficient and evaluating the resulting error to find an operation time conversion coefficient that minimizes the error, and the method involving multivariate analysis technique such as least-square approach for calculating an operation time conversion coefficient that minimizes the error. The present invention is not limited to any of these methods.

In step S601, an average error $E_{Initial}$ between the operation time and the work time of each aggregation period before operation time conversion is calculated by $\Sigma((totAT_j-totST_j)/totAT_j)$/number of aggregation periods.

In step S602, the value of $E_{Initial}$ is stored into the error before conversion in the average error information table.

In step S603, the value of $E_{Initial}$ is substituted into a minimum error $E_{min}$.

In step S604, the conversion iteration count upper limit M is acquired from the parameter information table.

Steps S605 through S613 are repeated from 1 to M on the counter "i."

In step S606, the operation time conversion coefficient in the operation time information table is temporarily saved into a matrix Coefs.

In step S607, the operation time conversion coefficient is changed, and the changed operation time conversion coefficient is stored into the operation time conversion coefficient table. For example, if the average error is larger than "0," the operation time conversion coefficient is incremented by a unit quantity; if the average error is smaller than "0," then the operation time conversion coefficient is decremented by a unit quantity. With this method, a different variation of the operation time conversion coefficient may be used for each of the product types, and the operation time conversion coefficient may be calculated in a manner minimizing the average error per product type.

In step S608, the per-period operation time aggregation process described above is performed. In this process, the total operation time of each aggregation period is calculated after the operation time conversion coefficient is changed. This embodiment uses the method of incrementing or decrementing the operation time conversion coefficient by a unit quantity when the average error is either positive or negative, with an upper limit placed on the iteration count as the condition for terminating the change of the operation time conversion coefficient. However, this or any other method is not limitative of the present invention.

In step S609, an average error $E_{tmp}$ between the operation time and the work time of each aggregation period after operation time conversion is calculated by $\Sigma((totAT_j-totST_j)/totAT_j)$/number of aggregation periods.

In step S610, it is determined whether $E_{tmp}$ is smaller than $E_{Min}$. If $E_{tmp}$ is determined to be smaller than $E_{min}$, step S611 is reached; if $E_{tmp}$ is found larger than $E_{Min}$, step S612 is reached.

In step S611, the value of $E_{tmp}$ is substituted into $E_{Min}$.

In step S612, the values of the elements in Coef in which the operation time conversion coefficient was temporarily saved are stored into the operation time conversion coefficient column in the operation time information table.

In step S614, the value of EMin is stored into the error after conversion in the average error information table.

FIG. 25 is a schematic view showing a typical input screen. FIG. 25 gives an example of the input screen for setting parameter information. This input screen includes, for example, an aggregation target process input region 131a, an aggregation start date and time input region 131b, an aggregation end date and time input region 131c, an aggregation unit period input region 131d, and a conversion iteration count upper limit input region 131e. The information input through this input screen is stored into the parameter information storage region 114 of the storage unit 110 mentioned above.

Figure 26:
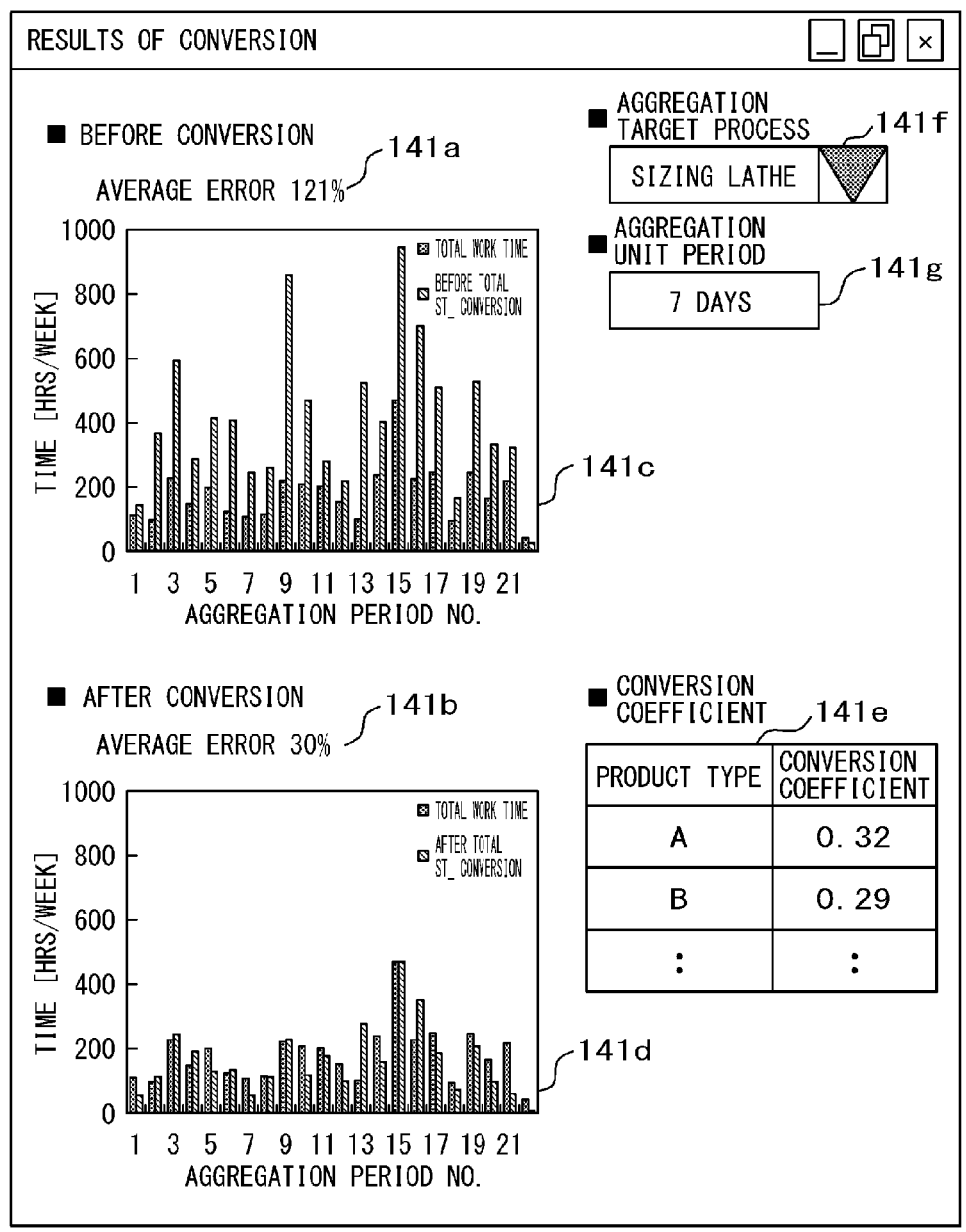
FIG. 26 is a schematic view showing a typical output screen.

FIG. 26 is a schematic view showing a typical display screen. FIG. 26 shows the display screen for displaying the information from the aggregation result information storage region 115, operation time information storage region 113, and average error information storage region 116 of the storage unit 110 mentioned above. The display screen includes, for example, a before-conversion average error display region 141a, an after-conversion average error display region 141b, a before-conversion aggregation result display region 141c, an after-conversion aggregation result display region 141d, and a product-type-wise conversion coefficient display region 141e. This display screen allows the user of the operation time calculation device to verify the values of the operation time conversion coefficients and a conversion-induced change in the average error. Also, this display screen may be arranged to further include, for example, an aggregation target process display/selection region 141f and an aggregation unit period display/input region 141g allowing the aggregation target process and the aggregation unit period to be changed and the changed aggregation target process and aggregation unit period to be displayed.

REFERENCE SIGNS LIST

110 . . . Storage unit
111 . . . Operation result information storage region
111a . . . Component number column
111b . . . Product type column
111c . . . Operation process number column
111d . . . Operation process column
111e . . . Operation start date and time column
111f . . . Operation end date and time column
112 . . . Work time information storage region
112a . . . Date column
112b . . . Equipment/worker number column
112c . . . Assigned process column
112d . . . Work time column
113 . . . Operation time information storage region
113a . . . Product type column
113b . . . Operation process number column
113c . . . Operation process column
113d . . . Initially set operation time column
113e . . . Operation time conversion coefficient column
114 . . . Parameter information storage region
114a . . . Item column
114b . . . Value column
115 . . . Aggregation result information storage region
115a . . . Aggregation period start date and time column
115b . . . Aggregation period end date and time column
115c . . . Total work time column
115d . . . Before-conversion total operation time column
115e . . . After-conversion total operation time column
116 . . . Average error information storage region
116a . . . Item column
116b . . . Value column
120 . . . Control unit
121 . . . Aggregation period setting unit
122 . . . Per-period work time calculation unit
123 . . . Operation implementation period estimation unit
124 . . . Per-period operation time calculation unit
125 . . . Error evaluation and coefficient calculation unit
130 . . . Input unit
131a . . . Aggregation target process input region
131b . . . Aggregation start date and time input region
131c . . . Aggregation end date and time input region
131d . . . Aggregation unit period input region
131e . . . Conversion iteration count upper limit input region
131f . . . Input enter key
140 . . . Display unit
141a . . . Before-conversion average error display region
141b . . . After-conversion average error display region
141c . . . Before-conversion aggregation result display region
141d . . . After-conversion aggregation result display region
141e . . . Product-type-wise conversion coefficient display region 141f . . . Aggregation target process display/selection region
141g . . . Aggregation unit period display/input region
150 . . . Communication unit
151 . . . CPU (Central Processing Unit)
152 . . . Memory
153 . . . External storage device
154 . . . Communication device
155 . . . Output device
156 . . . Input device
157 . . . Read/write device
158 . . . Storage medium
159 . . . Communication network
200 . . . Operation time calculation system
210 . . . Operation time calculation device
220 . . . Work result management device
230 . . . Process management device
240 . . . Operation result management device
250 . . . Network

The invention claimed is:

1. An operation time calculation device using operation result information from a manufacturing floor, the operation time calculation device comprising:
a storage unit, an input unit, a control unit, and a display unit,
wherein the storage unit stores:
operation result information including at least operation process information, start date and time information, and end date and time information about each operation implemented;
work time information including at least an assigned process, a date, and a work time per piece of equipment and per worker; and
operation time information including at least a product type, an operation process, an initially set operation time, and an operation time conversion coefficient,
wherein the input unit accepts input, from a user, of parameters regarding at least an aggregation target process, an aggregation start date and time, an aggregation end date and time, and an aggregation unit period,
wherein the control unit performs:
a process in which an aggregation period is set based on the input aggregation start date and time, aggregation end date and time, and aggregation unit period;
a process in which a total work time of the aggregation target process in each aggregation period is calculated by a search through the work time information, and a total operation time of the aggregation target process in each aggregation period is calculated by a search through the operation result information and the operation time information and by converting the corresponding operation time using the operation time conversion coefficient;
a process in which an error is calculated between the total work time and the total operation time in each aggregation period; and
a process in which the operation time conversion coefficient is changed so as to minimize the error, wherein the error $((totAT.sub.j - totST.sub.j)/totAT.sub.j)$ between the total work time $(totAT.sub.j)$ and the total operation time $(totST.sub.j)$ in each aggregation period $(R.sub.j)$ is calculated, and the operation time conversion coefficient is changed so as to bring the total operation time close to the total work time in each aggregation period, thereby minimizing an average of the errors from the aggregation periods, and
wherein the display unit displays the operation time conversion coefficient, a graph comparing the total work time with the total operation time in each aggregation period before and after the operation time conversion, and the errors involved, all being obtained in the processes performed by the control unit.

2. The operation time calculation device according to claim 1, wherein the control unit further performs a process in which non-registered start date and time data or non-registered end date and time data in the operation result information is estimated using the operation result information about processes before and after the operation in question, thereby preparing the operation result information complete with the estimated start date and time data and end date and time data.

3. An operation time calculation method using operation result information from a manufacturing floor, the operation time calculation method comprising causing a computer equipped with a storage unit, an input unit, a control unit, and a display unit to function so that:
the storage unit stores
operation result information including at least operation process information, start date and time information, and end date and time information about each operation implemented,
work time information including at least an assigned process, a date, and a work time per piece of equipment and per worker, and
operation time information including at least a product type, an operation process, an initially set operation time, and an operation time conversion coefficient;
the input unit accepts input, from a user, of parameters regarding at least an aggregation target process, an aggregation start date and time, an aggregation end date and time, and an aggregation unit period;
the control unit performs
a process in which an aggregation period is set based on the input aggregation start date and time, aggregation end date and time, and aggregation unit period,
a process in which a total work time of the aggregation target process in each aggregation period is calculated by a search through the work time information, and a total operation time of the aggregation target process in each aggregation period is calculated by a search through the operation result information and the operation time information and by converting the corresponding operation time using the operation time conversion coefficient,
a process in which an error is calculated between the total work time and the total operation time in each aggregation period, and
a process in which the operation time conversion coefficient is changed so as to minimize the error, wherein the error $((totAT.subj - totST.sub.j)/totAT.sub.j)$ between the total work time $(totAT.sub.j)$ and the total operation time $(totST.sub.j)$ in each aggregation period $(R.sub.j)$ is calculated, and the operation time conversion coefficient is changed so as to bring the total operation time close to the total work time in each aggregation period, thereby minimizing an average of the errors from the aggregation periods; and the display unit displays the operation time conversion coefficient, a graph comparing the total work time with the total operation time in each aggregation period before and after the operation time conversion, and the errors involved, all being obtained in the processes performed by the control unit.

4. The operation time calculation method according to claim 3, further comprising causing the control unit to perform a process in which non-registered start date and time data or non-registered end date and time data in the operation result information is estimated using the operation result information about processes before and after the operation in question, thereby preparing the operation result information complete with the estimated start date and time data and end date and time data.

* * * * *